United States Patent Office 3,133,898
Patented May 19, 1964

3,133,898
DIPHENOL TEREPHTHALATE-DIPHENOL ISOPHTHALATE COPOLYESTERS
Max H. Keck, Cuyahoga Falls, Ohio, assignor to The Goodyear Tire & Rubber Company, Akron, Ohio, a corporation of Ohio
No Drawing. Filed Sept. 8, 1959, Ser. No. 838,404
8 Claims. (Cl. 260—47)

This invention relates to high molecular weight linear aromatic copolyesters. More particularly, this invention relates to diphenol terephthalate-diphenol isophthalate copolyesters.

It is an object of this invention to provide new copolyesters which can be made into fibers, films and coatings. It is another object of this invention to provide self-supporting films of new copolyesters. It is still another object of the invention to provide copolyesters having outstanding electrical properties. Another object of the invention is to provide copolyesters having outstanding abrasion resistance. Another object of the invention is to provide copolyesters having a high melting point, high softening point, and improved solubility. Other objects of the invention will become apparent as the description of the invention proceeds.

The copolyesters of this invention are high molecular weight linear random copolyesters of a diphenol of the general formula

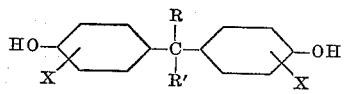

in which R and R′ are the same or different members selected from the group consisting of alkyl, alkene, alkaryl, aryl radicals and hydrogen and R and R′ may together form a single chain or ring and X is a member selected from the group consisting of hydrogen, chlorine and alkyl radicals having from 1 to 4 carbon atoms in the alkyl chain. These copolyesters can be prepared by methods generally used for the preparation of linear polyesters of high-boiling glycols and are most conveniently made by reacting the acid chlorides of terephthalic acid and isophthalic acid with a diphenol and removing the hydrogen chloride formed in the reaction.

The following examples illustrate the preparation of the copolyesters of the invention.

EXAMPLE 1

*Preparation of an 80/20 2,2-Di[4-Hydroxyphenyl]Propane Terephthalate - 2,2 - Di[4 - Hydroxyphenyl]Propane Isophthalate Copolyester*

Twenty-two and eighty-three hundredths grams of 2,2-di[4-hydroxyphenyl]propane, 16.2424 grams of terephthaloyl chloride, 4.0606 grams of isophthaloyl chloride, and 100 milliliters of dichloroethyl benzene were placed in a small 3-neck glass flask equipped with a stirrer, a nitrogen inlet tube, and a reflux condenser. The mixture was stirred and the temperature was gradually raised from room temperature to 215° C. over a period of 3½ hours. A slow stream of nitrogen gas was run through the reaction mixture to facilitate removal of the hydrogen chloride formed by the reaction. The mixture was stirred for one hour at 215° C. and then the hot solution was transferred to a 1-liter beaker and 250 milliliters of hot toluene were added with stirring. The polymer precipitated as a fine granular precipitate. It was filtered onto a Buchner funnel, washed with hexane and dried in an air draft oven at 55–65° C. A yield of 32 grams of dry polymer having a crystalline melting point of 350° C. and a softening point of 188° C. was obtained. The polyester had an intrinsic viscosity of 0.747.

EXAMPLE 2

*Preparation of a 40/60 2,2-Di[4-Hydroxyphenyl]Propane Terephthalate - 2,2 - Di[4 - Hydroxyphenyl]Propane Isophthalate Copolyester*

Forty-five and sixty-six hundredths grams of 2,2-di[4-hydroxyphenyl]propane, 24.3636 grams of isophthaloyl chloride, 16.2424 grams of terephthaloyl chloride, and 200 milliliters of dichloroethyl benzene were placed in a small 3-neck glass flask equipped with a stirrer, a nitrogen inlet tube and a reflux condenser. The reaction temperature was raised to 220° C. over a 30-minute period and the mixture was heated for 6 to 7 hours at 220° C. A slow stream of nitrogen gas was run through the reaction mixture to facilitate removal of the hydrogen chloride formed by the reaction. The resulting viscous solution was transferred to a 1-liter beaker containing 50 milliliters of boiling dichloroethyl benzene. The solution was vigorously stirred by means of a counter-rotating stirrer and 550 milliliters of toluene were added. The solution gradually became opaque and on standing overnight an oily gelatinous precipitate settled out. The supernatant liquid was decanted off and 350 milliliters of xylene were added with stirring. The gelatinous precipitate gradually changed into a white crumbly solid which was easily pulverized. The solid was washed with xylene and then with hexane and dried. Fifty-nine grams of dry polymer having a crystalline melting point of 228 to 231° C. and a softening point of 180° C. was obtained. The polyester had an intrinsic viscosity of 0.778.

Various copolyesters over the range of from 90/10 to 10/90 of 2,2-di[4-hydroxyphenyl]propane terephthalate-2,2-di[4-hydroxyphenyl]propane isophthalate were made by the method of Examples 1 and 2. Properties of these copolyesters are listed in Table I below.

TABLE I

| 2,2-di[4-hydroxyphenyl]propane terephthalate/2,2-di[4-hydroxyphenyl]propane isophthalate ratio | Intrinsic viscosity | Melting point, °C. | Softening point, °C. |
|---|---|---|---|
| 90/10 | ------ | 335-337 | ------ |
| 80/20 | 0.747 | 325-330 | 188 |
| 75/25 | 0.379 | 315-320 | ------ |
| 70/30 | 0.679 | 286 | 192.5 |
| 60/40 | 0.758 | 253-258 | 192 |
| 50/50 | 0.565 | 238-241 | 173 |
| 40/60 | 0.778 | 228-231 | 180 |
| 30/70 | 0.498 | 220 | ------ |
| 20/80 | 0.491 | 218-222 | 181 |
| 10/90 | 0.541 | 238-241 | 170 |

The copolyesters of the invention have outstanding electrical properties. The results obtained on testing films of the copolyesters for dielectric strength are presented in Table II.

TABLE II

| 2,2-di[4-hydroxyphenyl]propane terephthalate/2, 2-di[4-hydroxyphenyl]propane isophthalate ratio | Dielectric strength (volts per mil) |
|---|---|
| 70/30 (sample thickness—13 mil) | 2,000 |
| 40/60 (sample thickness—8 mil) | 2,000 |
| 20/80 (sample thickness—6.5 mil) | 2,400 |

The copolyesters of this invention have excellent resistance to abrasion and compare favorably with ethylene terephthalate-ethylene isophthalate copolyesters which are considered to be outstanding in this regard.

Abrasion resistance was determined by the Taber Abrasion Resistance Test. The copolyesters are compared with a 60/40 ethylene terephthalate-ethylene isophthalate copolyester in Table III.

TABLE III

| Polymer and composition | Taber abrasion (g./1000 cycles) 1000 g. load CS-17 wheel |
|---|---|
| Abrasion resistance of 2,2-di[4-hydroxyphenyl]propane terephthalate-2,2-di[4-hydroxyphenyl] propane isophthalate copolymer: | |
| 80/20 | 0.0021 |
| 70/30 | 0.0065 |
| 40/60 | 0.0015 |
| 20/80 | 0.0033 |
| 10/90 | 0.0060 |
| Abrasion resistance of ethylene terephthalate-ethylene isophthalate copolymer: | |
| 60/40 | 0.0027 |

The copolyesters of this invention have outstanding resistance to degradation by heat. A sample of a 70/30 2,2-di[4-hydroxyphenyl]propane terephthalate-2,2-di[4-hydroxyphenyl]propane isophthalate copolyester was heated for 1½ hours over the range of from 480–540° F. and molded into a bar. The resulting bar had good strength and the color was comparable with another sample of the same copolyester molded for 10 minutes at 540° F. Clear, strong films of the 60/40, 70/30 and 80/20 copolyesters were molded at a temperature range of from 600 to 610° F. Fibers could be drawn from these copolyesters.

The copolyesters of the invention were tested for solubility in various solvents according to the following procedure: A 0.1 gram sample of the granular copolymer was placed in a ¾ inch (inside diameter) test tube and 1 milliliter of the solvent being investigated was added. The mixture was stirred mechanically for 15 minutes, using a small stainless steel spatula as a stirring blade. If the copolymer sample dissolved within 15 minutes it was classified as S (readily soluble). If the greater part of the sample was dissolved during the 15-minute stirring cycle and the application of a hot water bath for a few minutes resulted in a clear solution, the copolymer was classified as Mod. S (moderately soluble). If the copolymer sample did not dissolve at room temperature and dissolved only slightly on being heated it was classified as S1. S (slightly soluble). Copolymer samples which did not dissolve in hot solvent, or which dissolved partially in hot solvent and then precipitated out at room temperature were classified as I (insoluble).

The data obtained in the solubility tests are tabulated in Table IV below:

TABLE IV.—SOLUBILITY DATA
[2,2-di[4-hydroxyphenyl] propane terephthalate-2,2-di[4-hydroxyphenyl] propane isophthalate copolymer]

| Composition | CHCl₃ | Cyclohexanone | Dioxane | Chlorobenzene | Cl₂HC·CHCl₂ |
|---|---|---|---|---|---|
| 80/20 | Mod. S | Mod. S | S1. S | Mod. S | |
| 75/25 | S | S | S1. S | Mod. S | |
| 70/30 | S | S | Mod. S | S | |
| 60/40 | S | S | S | S | |
| 50/50 | S | S | S | S | S |
| 40/60 | S | S | S | S | |
| 30/70 | S | S | S | S | |
| 20/80 | S | S | S | S | |
| 10/90 | Mod. S | S | I | | |

The invention provides a family of copolyesters whose properties vary over the range of composition. The copolyesters in the range of from 90 to 10% of diphenol terephthalate and from 10 to 90% of diphenol isophthalate are crystallizable. The copolyesters in the range of from 90 to 70% of diphenol terephthalate and from 10 to 30% of diphenol isophthalate are particularly useful for the preparation of fibers and films having high strength and good stability to heat. The copolyesters in the range of from 30 to 20% of diphenol terephthalate and 70 to 80% of diphenol isophthalate crystallize slowly and less completely than copolyesters having higher percentages of diphenol terephthalate.

Copolyesters containing high terephthalate content have limited solubility. The most soluble copolyesters are the copolyesters containing from 50 to 30% of the diphenol terephthalate and correspondingly from 50 to 70% of the diphenol isophthalate. These copolyesters are soluble in solvents such as chloroform, ethylene dichloride, trichloroethane, chlorobenzene, dioxane, benzene, cyclohexanone, and tetrahydrofuran and solutions in said solvents are particularly useful for solution coating applications. The 50/50 and 40/60 diphenol terephthalate-diphenol isophthalate copolyesters are the preferred copolyesters for solution-type applications.

The invention has been particularly illustrated with respect to 2,2-di[4-hydroxyphenyl]propane terephthalate-2,2 - di[4 - hydroxyphenyl]propane isophthalate copolyesters. Other diphenols may be used to prepare the copolyesters of this invention. The properties of the 50/50 and 70/30 terephthalate-isophthalate copolyesters of 3,3-di[4-hydroxyphenyl]pentane; 1,1-di[4 - hydroxyphenyl]propane; 1,1 - di[4 - hydroxyphenyl]butane; 2,2-bis[4-hydroxy - 3 - methylphenyl]propane and 1,1-di[4-hydroxyphenyl]cyclohexane are set forth in Table V.

TABLE V

| Diphenol | 50/50 terephthalate-isophthalate copolyester |
|---|---|
| 3,3-di [4-hydroxyphenyl] pentane | Soft. pt.—188° C. M. pt.—285–290° C. |
| 1,1-di [4-hydroxyphenyl] propane | Soft. pt.—154° C. M. pt.—165–167° C. |
| 1,1-di [4-hydroxyphenyl] butane | Soft. pt.— M. pt.—155–160° C. |
| 2,2-bis [4-hydroxy-3-methylphenyl] propane | Soft. pt.—164° C. M. pt.—176–181° C. |

| Diphenol | 70/30 terephthalate-isophthalate copolyester |
|---|---|
| 3,3-di [4-hydroxyphenyl] pentane | Soft. pt.— M. pt.—above 350° C. |
| 1,1-di [4-hydroxyphenyl] propane | Soft. pt.—166° C. M. pt.—277–281° C. |
| 1,1-di [4-hydroxyphenyl] butane | Soft. pt.—156° C. M. pt.—245° C. |
| 2,2-bis [4-hydroxy-3-methylphenyl] propane | Soft. pt.—167° C. M. pt.—193–198° C. |
| 1,1-di [4-hydroxyphenyl] cyclohexane | Soft. pt.—249° C. M. pt.—300–305° C. |

Soft. pt.—Softening point. M. pt.—Melting point.

Other diphenols can be used. Representative examples are bis[4-hydroxyphenyl]methane, di[4-hydroxyphenyl]methyl methane, di[4-hydroxyphenyl]diphenyl methane, di[4 - hydroxyphenyl]phenyl methane, 1,1-di[4-hydroxyphenyl]-1-phenyl ethane, di[4-hydroxyphenyl]-4-methyl phenyl methane, di[4-hydroxyphenyl]-1-[4-methylphenyl]ethane, di[4-hydroxyphenyl]-1-[4-tertiary butyl phenyl]ethane.

The copolyesters of the invention have unusually high softening points and excellent dielectric strength. They have particularly useful properties for wire coatings and electrical insulation of various types. Electrical conductors can be coated with these copolyesters by coating the conductor with hot molten copolyester. The soluble copolyesters are conveniently coated onto a conductor from solution in a solvent. The conductor is dipped in a solution of the copolyester, the solvent is evaporated off and the coated insulator is heated to a temperature high enough to insure complete fusion of the copolyester resin.

Films are made from the copolyesters of the invention by techniques similar to those employed with other linear condensation polymers. Thus, films can be made by melt extrusion or by casting film from a solution of the copolyester. The films can be oriented in one or more directions by "cold drawing." For some purposes, it is desirable to subject the film to biaxial or planar orientation, e.g. by stretching the film in two directions at right angles to each other.

Fibers can be made from the copolyesters of the invention by melt extrusion and, if desired, can be oriented by "cold drawing." Fibers can also be made from the soluble copolyesters by solution spinning. The preferred copolyesters for solution spinning are those in the range of 70/30 diphenol terephthalate-diphenol isophthalate to 20/80 diphenol terephthalate-diphenol isophthalate and, more particularly, the copolyesters in the range of from 60/40 diphenol terephthalate-diphenol isophthalate to 40/60 diphenol terephthalate-diphenol isophthalate.

The invention thus provides a series of random linear copolyesters having valuable properties for many uses. When they are prepared by reacting the diphenol with the acid chlorides, the hydrogen chloride formed in the reaction must be removed from the reaction mixture. It can be removed by sweeping out the hydrogen chloride with an inert gas such as nitrogen as shown in the illustrative examples. The hydrogen chloride can also be removed by a hydrogen chloride acceptor such as pyridine or sodium bicarbonate which may be present in the reaction mixture.

In order to have good physical properties, the copolyesters should have a high molecular weight, i.e. they should have an intrinsic viscosity of at least 0.4 and preferably at least 0.5. In usual practice the intrinsic viscosity will be between 0.5 and 0.8.

Among other purposes for which the copolyesters of the invention are useful are protective coatings for wood, metal, plastics, etc.; films for pressure-sensitive tape, magnetic tape, electrical tape, laminating film for glass, metal, etc.; electrical insulating coatings for tools; wires; instruments; capacitors, etc.; fibers and fabrics; and molded articles.

While certain representative embodiments and details have been shown for the purpose of illustrating the invention, it will be apparent to those skilled in the art that various changes and modifications may be made therein without departing from the spirit or scope of the invention.

I claim:

1. A random diphenol terephthalate-diphenol isophthalate copolyester in which the diphenol terephthalate units comprise from 90 to 70% of the sum of the diphenol terephthalate and diphenol isophthalate units in the copolyester and the diphenol isophthalate units comprise from 10 to 30% of said sum, said diphenol having the general formula

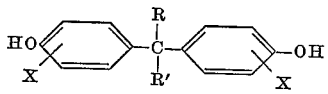

in which R and R' are selected from the group consisting of alkyl, alkene, alkaryl, aryl radicals and hydrogen and R and R' may together form a ring and X is a member selected from the group consisting of hydrogen, chlorine and alkyl radicals having from 1 to 4 carbon atoms in the alkyl chain.

2. A random linear 2,2-di[4-hydroxyphenyl]propane terephthalate-2,2-di[4-hydroxyphenyl]propane isophthalate copolyester in which the 2,2-di[4-hydroxyphenyl]propane terephthalate units comprise from 90 to 70 percent of the sum of the 2,2-di[4-hydroxyphenyl]propane terephthalate and 2,2-di[4-hydroxyphenyl]propane isophthalate units in the copolyester and the 2,2-di[4-hydroxyphenyl]propane isophthalate units comprise from 10 to 30 percent of said sum.

3. A film of a random linear 2,2-di[4-hydroxyphenyl]propane terephthalate - 2,2 - di[4-hydroxyphenyl]propane isophthalate copolyester in which the 2,2-di[4-hydroxyphenyl]propane terephthalate units comprise from 90 to 70 percent of the sum of the 2,2-di[4-hydroxyphenyl]propane terephthalate and 2,2-di[4-hydroxyphenyl]propane isophthalate units in the copolyester and the 2,2-di[4-hydroxyphenyl]propane isophthalate units comprise from 10 to 30 percent of said sum.

4. A biaxially oriented film of a random linear 2,2-di[4-hydroxyphenyl]propane terephthalate - 2,2 - di[4-hydroxyphenyl]propane isophthalate copolyester in which the 2,2-di[4-hydroxyphenyl]propane terephthalate units comprise from 90 to 70 percent of the sum of the 2,2-di[4-hydroxyphenyl]propane terephthalate and 2,2-di[4-hydroxyphenyl]propane isophthalate units in the copolyester and the 2,2-di[4-hydroxyphenyl]propane isophthalate units comprise from 10 to 30 percent of said sum.

5. A fiber of a random linear 2,2-di[4-hydroxyphenyl]propane terephthalate - 2,2-di[4-hydroxyphenyl]propane isophthalate copolyester in which the 2,2-di[4-hydroxyphenyl]propane terephthalate units comprise from 90 to 70 percent of the sum of the 2,2-di[4-hydroxyphenyl]propane terephthalate and 2,2-di[4-hydroxyphenyl]propane isophthalate units in the copolyester and the 2,2-di[4-hydroxyphenyl]propane isophthalate units comprise from 10 to 30 percent of said sum.

6. An oriented fiber of a random linear 2,2-di[4-hydroxyphenyl]propane terephthalate - 2,2 - di[4-hydroxyphenyl]propane isophthalate copolyester in which the 2,2-di[4-hydroxyphenyl]propane terephthalate units comprise from 90 to 70 percent of the sum of the 2,2-di[4-hydroxyphenyl]propane terephthalate and 2,2-di[4-hydroxyphenyl]propane isophthalate units in the copolyester and the 2,2-di[4-hydroxyphenyl]propane isophthalate units comprise from 10 to 30 percent of said sum.

7. An electrical conductor comprising an electrically conductive material having a coating of a random linear 2,2-di[4-hydroxyphenyl]propane terephthalate - 2,2-di[4-hydroxyphenyl]propane isophthalate copolyester in which the 2,2-di[4-hydroxyphenyl]propane terephthalate units comprise from 90 to 70 percent of the sum of the 2,2-di[4-hydroxyphenyl]propane terephthalate and 2,2-di[4-hydroxyphenyl]propane isophthalate units in the copolyester and the 2,2-di[4-hydroxyphenyl]propane isophthalate units comprise from 10 to 30 percent of said sum.

8. A copolyester according to claim 1 in which the diphenol is 1,1-di[4-hydroxyphenyl]cyclohexane.

References Cited in the file of this patent

UNITED STATES PATENTS

| | | |
|---|---|---|
| 2,035,578 | Wagner | Mar. 31, 1936 |
| 2,595,343 | Drewitt | May 6, 1952 |
| 2,762,789 | Fisher et al. | Sept. 11, 1956 |
| 2,854,434 | Beaman | Sept. 30, 1958 |
| 2,865,891 | Michel | Dec. 23, 1958 |

OTHER REFERENCES

Conix: Industrial and Engineering Chemistry, vol. 51, No. 2, pp. 147–50, February 1959.